Patented Apr. 14, 1925.

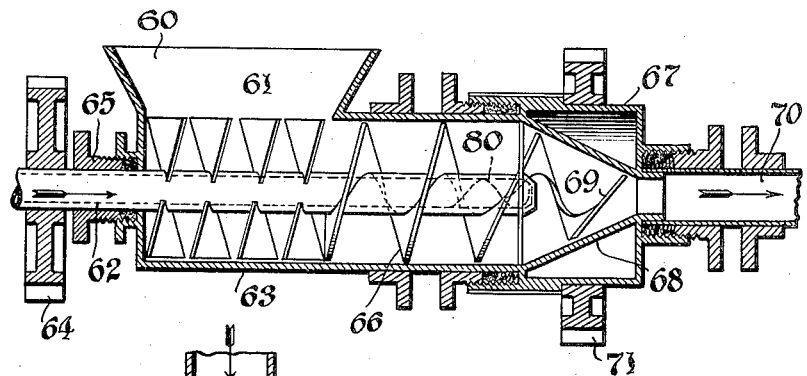
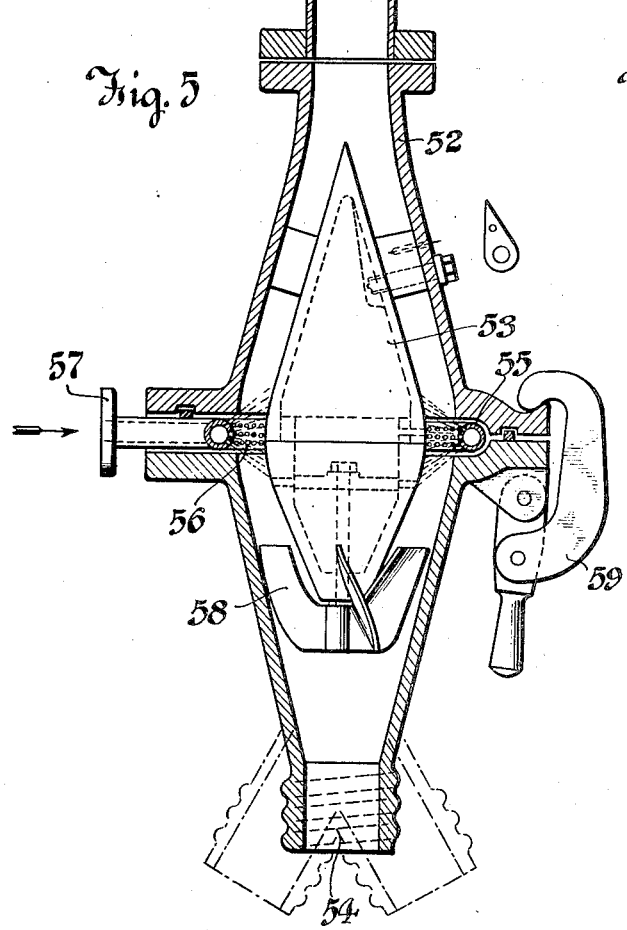
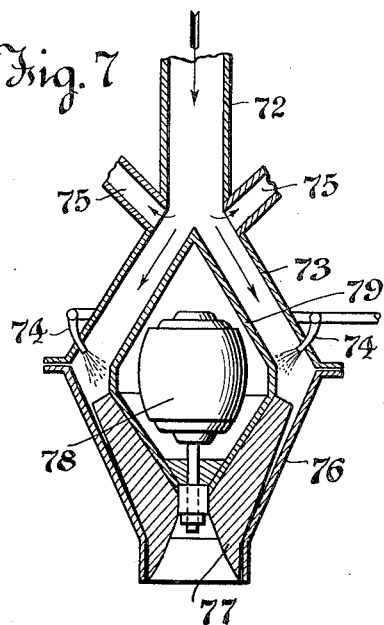

1,534,008

UNITED STATES PATENT OFFICE.

ERNST BONGARDT, OF MAINZ-ON-THE-RHINE, GERMANY.

METHOD AND MACHINE FOR MIXING, CONVEYING, AND DISTRIBUTING CONCRETE, MORTAR, AND THE LIKE.

Application filed April 14, 1924. Serial No. 706,574.

*To all whom it may concern:*

Be it known that I, ERNST BONGARDT, a citizen of the German Empire, and resident of Mainz-on-the-Rhine, Germany, have invented certain new and useful Improvements in Methods and Machines for Mixing, Conveying, and Distributing Concrete, Mortar, and the like; and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

This invention relates to a method and machine designed to mix in a convenient manner concrete mortar and other similar material, to convey the mixed material to the place where the work is done and to distribute it at this place. Several methods have already been proposed for conveying concrete to the place where the work is done, but all these methods present certain inconveniences. When compressed air is used it happens frequently that the pipe is clogged by concrete when the entire quantity of water necessary for the final concrete mixture is conveyed also through the pipe, considerable power being besides required for this purpose.

According to the improved method the concrete mortar is admixed only with so much water that it is no longer water refusing and the conveying is effected through making the mass rotate so that it executes in the conduit pipe a movement in spirals whereby the friction is considerably reduced so that power is economized and the heavy admixtures in the concrete mortar, as stones, small basalt and the like are conveyed along with the material without any separating of the concrete mortar. The conveying may be done by compressed air or not and in long conduit pipes several apparatus may be inserted at convenient distances apart for communicating a rotating movement to the mass.

The final additions of water are made only shortly before the mass flows out of the conduit pipe, e. g. at the place where the material has to be used, the whole mass being drawn out by a convenient arrangement to be admixed at this drawn out state, at reduced velocity of flow, with the required quantity of water.

The plant for carrying out this method serving for the construction of high buildings is preferably arranged in such a manner that at the foot of an extensible column a machine plant is arranged which mixes the materials for the concrete in convenient proportions to convey the same into the mixing and pressure apparatus which produces the rotation of the mass, the column has at its top an extensible jib along which extends the flexible tube so that any part of the building in course of construction can be supplied with concrete mortar owing to a corresponding adjusting of the column and of its jib. At the end of the jib, a short distance before the orifice of the flexible tube, the apparatus for admixing water with the material is arranged. For underground constructions the high column is not necessary, the plant remaining otherwise the same.

A form of construction of such a plant designed for the construction of a high building is shown, by way of example, on the accompanying drawings, wherein:

Fig. 5 shows the apparatus for drawing out the material and for admixing the same with water shortly before it comes out of the tubular conduit.

Figs. 6 to 13 illustrate an improved construction of the conveying device at the beginning of the conveying conduit and further a device for adding water to the mass at the end of said conveying conduit. All these figures being in section.

Fig. 6 shows the first mentioned device, and

Figure 1:
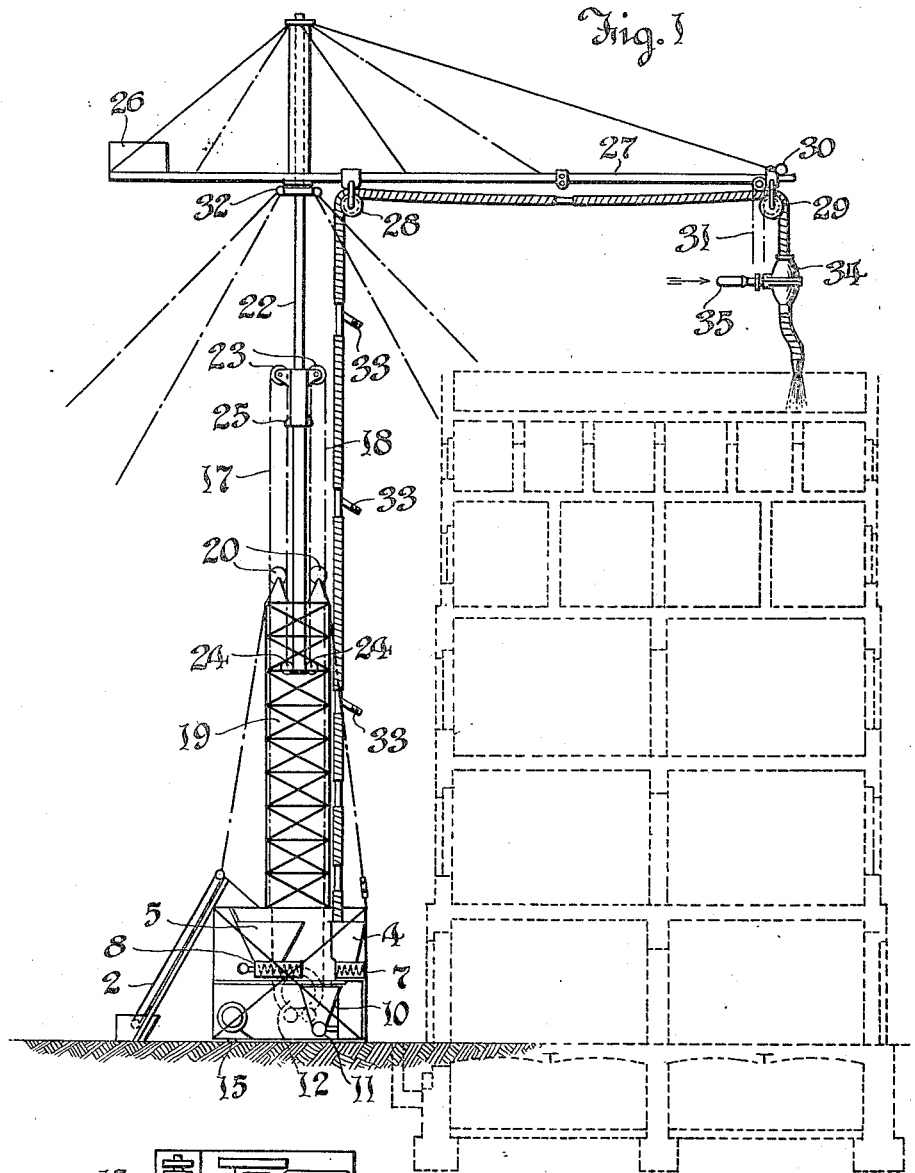
Fig. 1 shows the whole plant.

Fig. 7 the second mentioned device.

Figs. 8 and 9, 10 and 11, and 12 and 13 show each in longitudinal section and cross section respectively three special forms of construction of the drum 67 shown in Fig. 6.

Referring to Figs. 1 to 5, three elevators 1, 2 and 3 for the material are arranged at the foot of a high extensible column (Fig. 1), said elevators serving for transporting the materials to be admixed, e. g. cement, sand, and pebbles into the bunkers 4, 5 and 6. For these elevators bucket chains, endless conveying bands, worms or the like may be substituted. Under the bunkers 4, 5 and 6 the conveying worms 7, 8 and 9 are arranged the number of revolutions of which may be adjusted by displacement of a belt upon a stepped pulley or the like in accordance with the proportions of mixture of the concrete mixture to be produced.

The conveying worms 7, 8 and 9 serve for conveying the materials, e. g. cement, sand and stones into the bunker 10. Under this bunker 10 a mixing and conveying worm 11 is arranged with which a water pipe is connected. This worm 11 serves for mixing the materials with little addition of water and to force the same into a separate mixing and pressure apparatus 12 of special construction. In this mixing and pressure apparatus 12 which will be specially described hereafter a gyrating movement is communicated to the mixing material which is simultaneously conveyed in axial direction. As the flexible conduit pipe is connected with the other end of the mixing and pressure apparatus the material is thrown into this conduit pipe in gyrating motion. The compressed air which is necessary is produced by the compressor 13 and accumulated in the reservoir 14. The several pipes for the compressed air are connected with this reservoir 14. The elevators 1, 2 and 3, the worms 7, 8, 9 and 11 and the compressor are driven from the engine 15 through the intermediary of a suitable transmission. In the engine house a winch is further mounted which serves for adjusting the height of the telescopic column.

The lower part 19 of the column made of trellis work is rigidly connected with the engine house and at the upper end of this part two pulleys 20 are arranged. In the central axis of the trellis work part 19 of the column a pipe 21 is arranged so that it can be adjusted in a vertical direction, said tube being maintained always in accurately vertical position by suitable guidings. In this tube 21 a tube 22 is movably arranged, the second tube 22 being also maintained in vertical position by convenient guidings. At the head end of tube 21 two pulleys 23 and at its foot end a piece 24 are arranged, these three parts serving for the attachment of the wire cables 17 and 18. A similar piece 25, projecting through slits from inside the tube 21, supports at its lower end the tube 22. The wire cables 17 and 18 are attached to the lower ends of the two tubes 21 and 22 and wound around the pulleys 20 and 23 in such a manner that when said wire cables are wound around the rope drum of the winch 16 the tubes 21 and 22 are extended but lowered when the ropes are unwound. A jib is arranged at the upper end of tube 22 in such a manner that it can turn in a circle around its axle. This jib may be also telescopic and it is balanced by a counterweight 26 and carries at its free end 27 two pulleys 28 and 29. The pulley 28 is fixed and the pulley 29 is suspended to a trolley 30 mounted on the end 27 of the jib. This trolley 30 is operated by a hand chain 31. Between the trolley 30 and the pulley 29 a tackle may be inserted or a travelling hoist may be substituted for the trolley so that not only the distance between the pulley 29 and the central axis of the column can be varied but that said pulley may also be raised or lowered as required. The trolley 30 or the travelling hoist may be operated instead by a hand chain by electromotor or the like. Below the jib a suitable collar 32 is arranged on the column to which wire cables may be attached for staying the mass in the working position.

The conduit may consist of metal tubes, wooden tubes or the like, preferably rubber spiral tubes are however used. This conduit which is connected in the engine house with the mixing and pressure apparatus 12 is preferably conducted along the column and composed in its lower part of several parts which may be inserted or removed in accordance with the height at which the jib stands. Several tubular connecting pieces 33 are further arranged by means of which, according to requirement, branch conduits between the reservoir for compressed air and the ascending conduit may be produced in order to compensate the loss of pressure resulting from the friction of the material to be conveyed on the wall of the conduit pipe. The upper horizontal part of the conduit pipe rests upon the pulleys 28 and 29.

Figure 2:
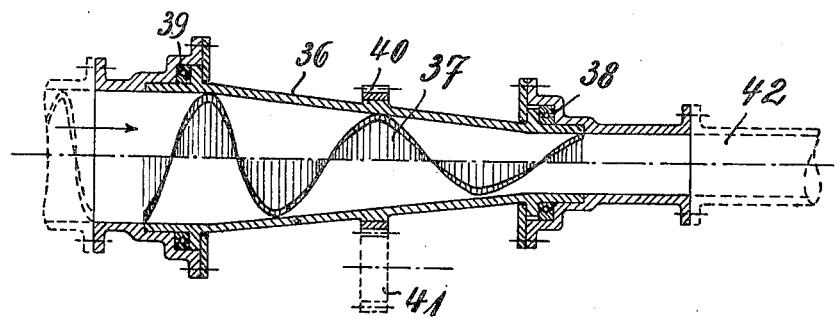
Fig. 2 shows on a larger scale in longitudinal section the mixing and pressure apparatus.

The mixing apparatus of the form of construction shown in Fig. 2 consists of a conical tube 36 in which a helical path 37 is arranged. This tube is mounted on ball bearings 38 and 39 and rotated by means of a pinion 41 gearing with the toothed wheel 40.

The material enters in the direction of the arrow and a rotating movement is communicated to the same by the helical path 37, compressed air being used for conveying the material into the pipe conduit 42. In the form of construction of the mixing and pressure apparatus shown in Fig. 3 the worm 37 is mounted on a shaft 43 which projects at 44 through the upwardly bent part of the conical tube 45, the projecting end of said shaft being revolved by a pinion drive 46, 47. In this form of construction the tube 45 may be stationary.

Figure 4:
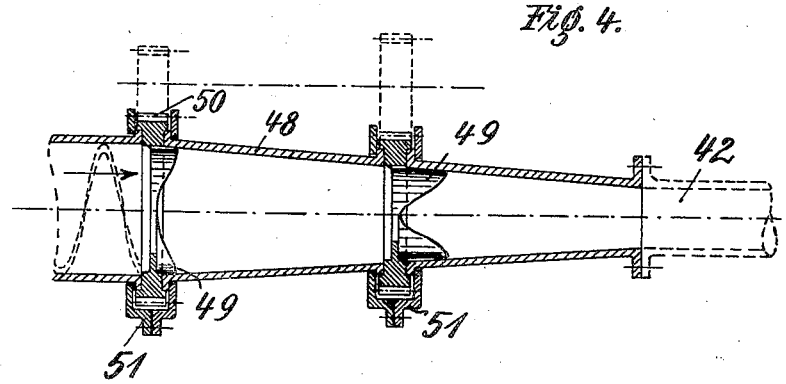

In the form of construction shown in Fig. 4 shovel-shaped wheels 49 are arranged at several points of the stationary conical tube 48, said wheels being revolved by a toothed wheel drive 50 so that the whole mass which traverses the tube is rotated and conveyed into the flexible tube 42. The pitches of the several wheels are different and the number of revolutions of the wheels are different also, for instance in such a manner that the smaller wheels near the outflow end of the tube revolve more rapidly and possess a greater pitch than the larger wheels. A convenient packing must be arranged consisting for instance in an annular flange 51 surrounding the wheels.

Figure 3:
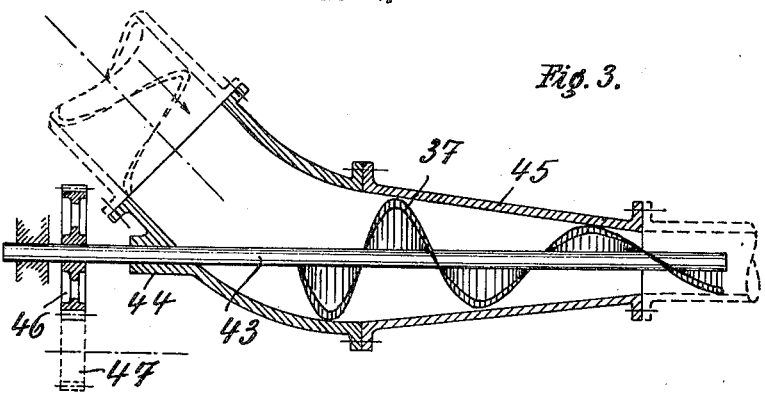
Figs. 3 and 4 are similar views showing modified forms of construction of the mixing and pressure apparatus.

The pitch of the worm 37 may also increase towards the outflow end in the form of construction shown in Figs. 1 and 3.

Shortly before the outflow end of the flexible conduit tube a special apparatus is arranged which is shown in Fig. 5 and which serves for drawing out or loosening the whole mass and for finely admixing the same with water. This apparatus consists of an outer hood 52 of double conical shape and of an inner closed hood 53. The material enters in the direction of the arrow and is conveyed to the outflow nozzle held by the workman at 54 either by one or by several tubular connecting pieces.

At the point of the greatest enlargement of the total cross section an annular tube 55 is inserted which has in its inner circumference a number of holes 56 and which is connected with the water-supply pipe 57. The required final quantity of water is added through this annular tube 55 and intimately admixed with the mass which has been drawn out between the two hoods and brought to a larger cross section. Behind the hood 53 a stationary or rotatable blade arrangement 58 is provided which produces a further mixing and which is eventually driven in a convenient manner.

The hood 52 is preferably composed of two parts held together by a clamp 59.

The operation of the plant is as follows:—

According to the height of the building to be constructed the column is adjusted to the required height. The speed of the conveyor worms 7, 8 and 9 is determined and adjusted in accordance with the desired mixing ratio. After the motor and the compressor have been started and when sufficient pressure is accumulated in the compressed air reservoir the several materials, cement, sand and stones, are charged into the buckets of the elevators 1, 2 and 3, said material being elevated in this manner and delivered to the bunkers 4, 5 and 6. The conveyor worms 7, 8 and 9 convey the material into the bunker 10, from which they are conveyed, by the mixing and conveying worm 11, to the mixing and pressure apparatus 12. The valve of the water-supply pipe, connected with the casing of the mixing and conveying worm 11, is opened only so far that the mixing material is only slightly moistened so that it is no longer water-refusing but is dustless when delivered at the end of the tubular conduit into the mixer 34 so that it readily absorbs a further quantity of water. The mixing and pressure apparatus 12 communicates a gyrating movement to the mixing material and throws the same at the same time into the conveying conduit. The gyrating movement of the mixing material prevents that the coarser parts of the mixture (stones and the like) separate from the finer parts (sand and cement). Several such mixing and pressure apparatus may be inserted according to the height of the conveying conduit so that a fresh gyrating movement is communicated from time to time to the mixing material. By the air pressure existing in the conveying tube the mixing material is conveyed to the end of the conduit. Before the material comes out of the conveying conduit it is spread out or drawn out in the mixing apparatus 34, whereby the velocity of flow is reduced and the material intimately admixed with water, so that it drops slowly from the conveying conduit in a slight gyrating movement. The percentage of water added to the mixing material before the same comes out of the conveying tube may be regulated by means of the valve in the water supply pipe 35 so that, according to requirement, the concrete is moist or wet. The end of the conveying conduit is guided by hand, the trolley or traveling hoist 30 being adjusted according to requirement.

With the aid of the plant described the concrete mortar can be automatically conveyed at the construction of a high building to any point of said building. The column and its jib may also be used for hoisting other building material, ashlars, poling boards and the like.

For underground constructions the column is evidently not required.

According to Figs. 6 to 13 the materials are delivered into a hopper 60, arranged above the hollow shaft 62 revolubly mounted in a receptacle 63 and having mixing blades 61, said hollow shaft being revolved by toothed wheels 64 and packed, at the entrance into the receptacle 63, by a packing box 65.

This hollow shaft 62 has mixing blades on the part under said hopper 60 and a conveying worm 66 on the remaining part, said worm being designed to convey the mixed material to a drum 67 in which the rotating movement is communicated to the material, which movement assists in the conveying. In this drum 67 a conical insertion 68 is arranged to the inner wall of which the worm 69 is attached. This insertion 68 terminates in the conveying conduit 70. The drum 67 together with the insertion 68 and with the worm 69 is rotated by the toothed wheel 71.

Only little water is added to the materials mixed in the receptacle 63 by means of the mixing blades 61, the mixed materials being then conveyed by the worm 66 into the conical insertion 68. Owing to the revolving movement of said insertion and owing to the action of the worm 69 in said insertion a rotating movement is communicated to said materials. The materials in the conical insertion are forced into the conduit 70 through the action of the air current flowing in through the hollow shaft 62 so that the whole mass, when entering into the conduit 70, is in gyrating movement. By means of helical guide plates 80 in the hollow shaft a rotating movement may be communicated to the air current. In the hollow shaft a separate air supply pipe might evidently be arranged.

The material conveyed through the long conveying conduit enters at 72 into the apparatus shown in Fig. 7. Owing to the double conical hood 73 the cross section of the mass is enlarged, water nozzles 74 being arranged at the point of the greatest enlargement through which the water which has to be added to the material is finely sprayed. At the point where the tube 72 terminates in the hood 73 rearwardly directed lateral tubular sockets 75 are arranged through which the air supplied by the hollow shaft 62 (Fig. 6) into the mass is vented so that this mass freely drops. The hood 73 gets gradually narrower in its lower conical part 76 which however at its smallest cross section is still wider than tube 72. Near the end of the apparatus a blade 77 is arranged which is rotated through the intermediary of a motor 78 arranged in the hood. This motor is enclosed by a double conical casing 79. The blade 77 serves for removing the moist mass which sticks to the walls of the hood from said walls and to mix the material again. For the blade a regular mixing apparatus might be substituted if required.

The mass drops freely out of the hood 73 so that it can be rammed directly.

Figure 8:
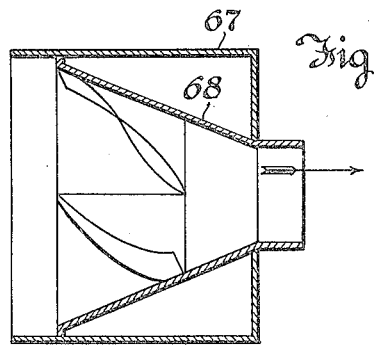
Figure 9:
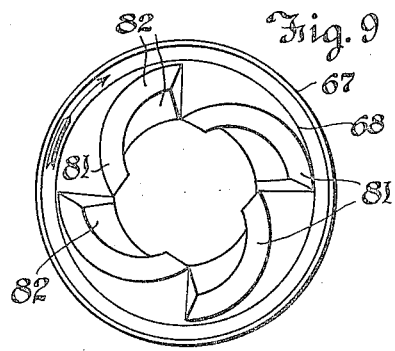

Instead of using the above described drum 67 rotated by the conveyed mass the drum shown in Figs. 8 and 9 may be used. In this form of construction four blades 81 are fixed on the inner wall of the insertion 68 and said blades are curved so that they conduct, when the drum 67 is rotating, the mass from the circumference of the insertion 68 in axial direction towards the centre of the drum 67, said mass being thus brought directly under the action of the air current. On said blades 81 helical-shaped blades 82 are arranged which serve for pushing the mass at the same time forward in the direction of the air current.

Figure 10:
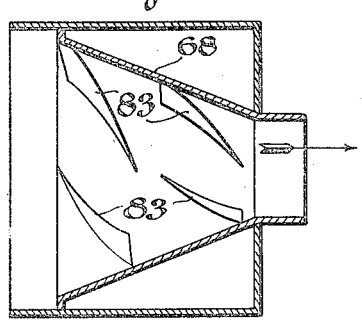
Figure 11:
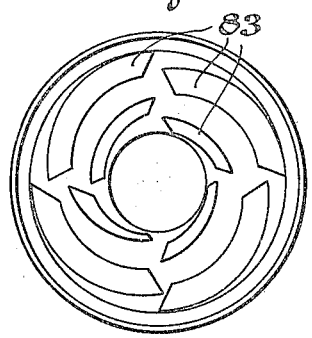

Figs. 10 and 11 show another form of construction according to which the insertion 68 has no continuous worm on its inner surface but several blades 83 which are curved in helical shape and which serve for pushing, when the drum is rotating, the mass at the same time towards the centre of the drum 67 and in forward direction.

Figure 12:
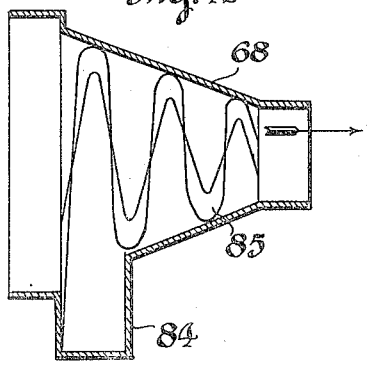
Figure 13:
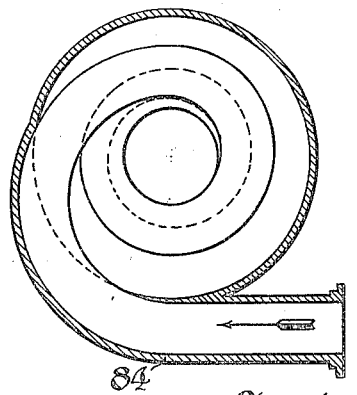

Figs. 12 and 13 show a form of construction in which the apparatus does not rotate; a second air current besides the air current from the hollow shaft 62 is supplied from a lateral tube 84. This air current, after having entered the insertion 68 is designed to execute a rotating movement along the inner wall of said insertion in moving at the same time forward in axial direction. This air current draws along the material which is delivered from the worm 66. With this object in view guide blades 85 for the air current are arranged in the insertion 68, said guide blades forcing the air current to execute the desired movement.

I claim:—

1. A method of conveying hydraulic cement mixtures through pipes, which comprises intimately mixing concrete constituents with less than sufficient water to hydrate the mixture to produce a dustless, relatively dry mixture, forwarding the mixture by compressed air while maintaining the mass in rotation, enlarging the cross-section of the mass being forwarded, and finally supplying the final quantity of water at the point of enlarged cross-section and contracting the so moistened mixture.

2. A method of conveying hydraulic cement mixtures through pipes, which comprises intimately mixing concrete constituents with only sufficient moisture to partially hydrate the mixture to form a dustless, relatively dry mixture, forcing the mixture through a conduit by compressed air while maintaining rotation of the mixture in the conduit, retarding the speed of the mixture just prior to discharge from the conduit and supplying the additional quantity of water to the mixture at the point of retardation, and finally imparting additional rotation to the mixture as it discharges.

3. In mechanism for conveying concrete through conduits, mechanism for mixing the constituents of the concrete with just sufficient water to partially hydrate the mixture and form a dustless, relatively dry product, a conduit, means to forward said mixture to the conduit while imparting rotation thereto, means to supply a current of propelling air to the conduit with the mixture, means at the discharge end of the conduit to cause the material to spread out and means thereat to supply the final additional required quantity of water to the mixture, and means to contract the mixture just before discharging it.

4. Mechanism for conveying concrete through conduits, comprising mechanism for mixing the concrete constituents with water just sufficient to partially hydrate the mixture, a conduit, means forming a continuation of said mixing mechanism to forward the mixture to said conduit, means to rotate the mixture as it enters the said conduit, means near the end of said conduit to spread out said mixture including means to supply the final required quantity of water to the mixture, and means to rotate the final mixture as it discharges.

5. Mechanism for conveying concrete through conduits, comprising a casing having a hopper for the concrete constitutents the water content of which is just sufficient to partially hydrate the constituents, a hollow air conveying shaft, mixing blades on said shaft beneath said hopper, forwarding blades also on said shaft beyond the mixing blades, a rotatable section for said casing at which said shaft terminates, a conduit into which said section discharges and a discharge apparatus at the end of said conduit comprising an outer double conical hood, an inner hood spaced therefrom, a water supply device at about the widest portion of said outer hood, and directing blades mounted at the end of the inner hood and extending between the hoods.

In testimony that I claim the foregoing as my invention I have signed my name.

ERNST BONGARDT.

Witnesses:
 JANE GIUSTI,
 GABRIELE FLESCH.